UNITED STATES PATENT OFFICE.

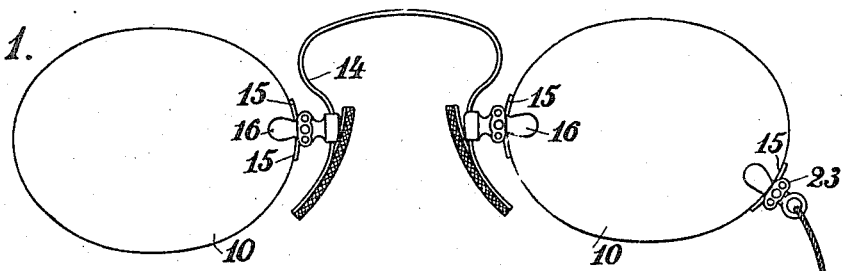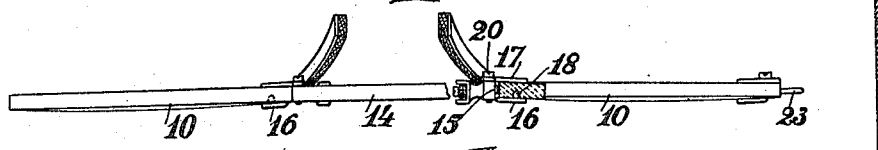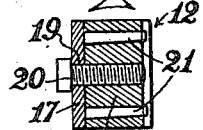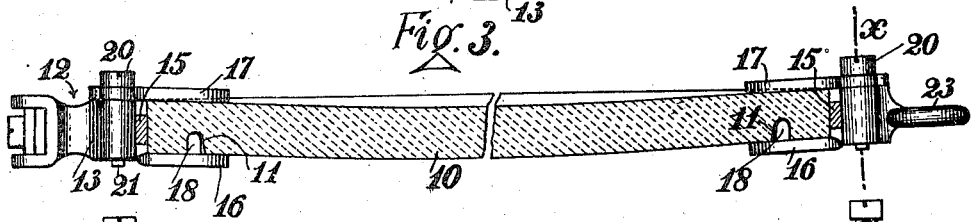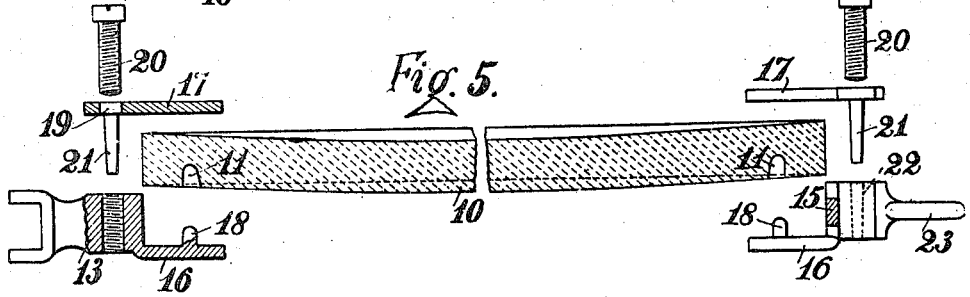

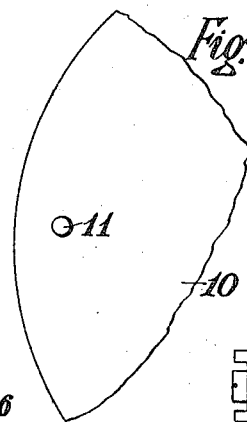
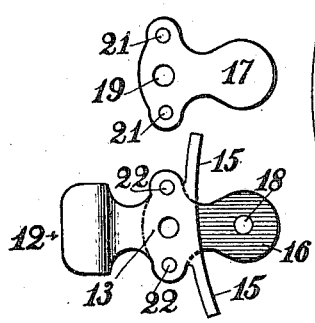
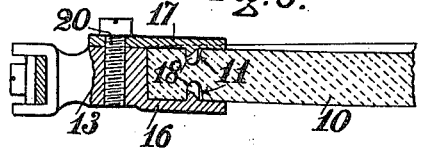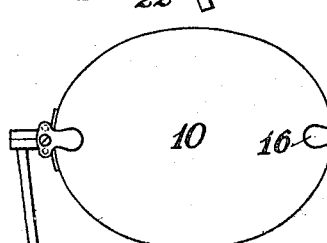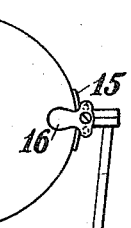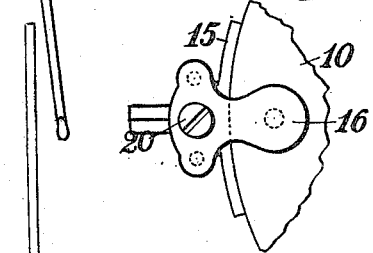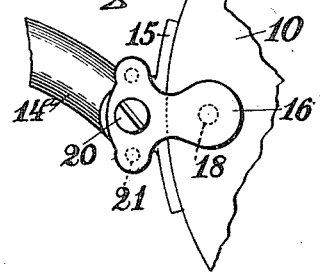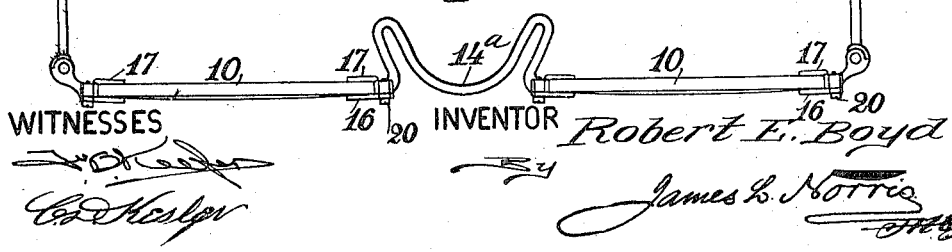

ROBERT ENNIS BOYD, OF BIRMINGHAM, ENGLAND.

RIMLESS EYEGLASSES AND SPECTACLES.

972,053.  Specification of Letters Patent.  Patented Oct. 4, 1910.

Application filed October 18, 1909. Serial No. 523,302.

*To all whom it may concern:*

Be it known that I, ROBERT ENNIS BOYD, subject of the King of Great Britain, residing at Great Tindal Street, Birmingham, England, have invented certain new and useful Improvements in Rimless Eyeglasses and Spectacles, of which the following is a specification.

This invention has relation to rimless eye glasses and spectacles and particularly to the attachment to the lenses or glasses of the metallic mounts or fittings such as the nose clips and cord attachments of eye glasses and the sides or wings or temples and ear hooks and bridges of spectacles.

Heretofore the application of the fittings to such lenses has usually involved the drilling of holes completely through the glass for the reception of the fixing screws or rivets with its attendant risk of breaking the lens during drilling or of permanently weakening the same when drilled with through holes, it being well known that the lens is always liable to "fly" or break from the point where it is drilled if the glasses are allowed to fall or to be subjected to even a slight jar.

Now the object of the present invention is to provide for a more effective and improved attachment of the fittings of the kind which renders it unnecessary to drill holes through the glass, thereby minimizing the risk of breakage or "flying" of the glass, and also to simplify the application of such fittings as well as to render the same readily adaptable or adjustable to lenses or glasses of different thicknesses.

According to my invention the glass or lens is formed, on the one side, or on each of the sides of the part to which a metallic mount is to be attached, with a shallow recess or countersink, and the mount itself is provided with a clip comprising a pair of cheeks or straps which are provided, on their inner sides, with studs, teats or key projections that correspond to the said recesses and are secured in engagement therewith so as to render it impossible to remove or displace the lens from or within the mount.

Figure 1 of the accompanying drawings represents a front elevation of a pair of rimless eye-glasses in which the nose-clip and the cord-eye are attached to the edges of the lenses, without involving the drilling of the glass, and in accordance with one form of my invention. Fig. 2 is an edge view of the said glasses. Fig. 3 represents, upon an enlarged scale, a longitudinal section of one lens and the metallic mount or fitting whereby the same is attached to the nose-clip. Fig. 4 is a section taken transversely (upon the dotted line $x$ Fig. 3) through the mount. Fig. 5 represents the lens and the parts of the mount or fitting separated or dis-assembled from one another. This view also shows the countersunk or recessed part of the lens in section. Fig. 6 is an elevation of the recessed part of the lens and Fig. 7 shows the parts of the metallic mount or attachment separately and in elevation.

The same letters of reference indicate corresponding parts in Figs. 1 to 7.

In the arrangement represented in these figures, the lens 10 is provided, near the edge and at the point where the fitting is to be attached, with a recess or countersink 11, while the mount 12 comprises (in the case of a nose-clip fitting) a body part 13 to the outer side of which the nose-clip spring 14 is secured in any convenient manner while the outer side is provided with curved tongues 15 which afford an extended bearing or seating for the curved edge of the lens. The said body is also provided with a pair of straps or cheeks 16, 17, which have the appearance of ordinary cheeks but, according to the invention, only one of the said straps (16) is made solid with or a standing fixture to the body of the mount whereas the other strap (17) is a loose separate piece. The standing cheek is provided on the inner side of the end which extends over the lens, with a stud or key-projection 18 which is adapted to be engaged within the recess or countersink 11 in the lens while the outer end of the detachable strap is pierced at 19 so that it may be secured to the side of the mount body by a screw 20. The same end of the detachable strap may also be provided with a pair of pins or dowels 21 which engage with corresponding holes 22 in the said body so as to prevent any twisting or angular displacement of the strap around the shank of the screw 20. With this arrangement, when the screw is turned home after the countersunk part of the lens has been inserted between the standing strap 16 and the detachable and adjustable one 17, the locking stud or key projection 18 is made to enter or engage the recess so that not only is the lens clipped between the two screw-connected straps but is positively locked against withdrawal or displacement by the engagement of the projection within the countersink. Further, by virtue of the dispositions of the engaging parts the curved edge of the lens is held closely up against the correspondingly curved and extended bearing formed by the tongues 15 and all shake or play between the connected parts is obviated. The cord attachment 23 (when used) is secured to the lens by the same means as is described in connection with the attachment of the nose-clip mounts.

Fig. 8 is a sectional view of a modification, in which both sides of the lens are provided with recesses or countersinks 11, separated by a thickness of solid glass, and both the standing and detachable cheeks or straps 16, 17 are formed, on their inner sides, with studs or key projections 18 that respectively engage the lens recesses when the parts are assembled and not only retain the lens within the clip, but such studs firmly hold the edge of the lens against the edge bearing ears on the body of the mount, drilling of the glass or lens being unnecessary to obtain such results. Fig. 9 represents a front elevation of a pair of spectacles in which the nose-bridge and the wings, temples or ear hooks are connected to the lenses in accordance with my invention. Fig. 10 is an edge view of the said spectacles. Fig. 11 is an elevation, on an enlarged scale, of one of the ear-hook mounts or attachment fittings. Fig. 12 is a similar elevation of one of the nose-bridge fittings.

The fittings shown in these Figs. 8 to 11 are similar to those shown in the preceding figures and are marked with the same reference numerals, a rigid ridge 14ª, however, being shown, and they provide for the securing of the lens between the cheeks or straps of the mount through the medium of one or more studs or projections on the said cheeks engaging with a corresponding recess or sinking in the lens.

When the detachable strap or cheek is secured to its fellow cheek and to the body of the count by a screw as in the constructions shown, the arrangement is adjustable and admits of a standard mount or fitting being adapted to a lens of any thickness within reasonable limits.

Having fully described my invention, what I desire to claim and secure by Letters Patent is:—

In eyeglasses and spectacles, the combination of a lens having a recess in one face extending but partially through the thickness thereof, and a mount comprising relatively adjustable and detachable members having straps to clamp the opposite faces of the lens, one of said straps having a projection to engage in said recess in the lens, one of said members having a plurality of spaced pins or dowels located outwardly beyond the lens edge and extending transverse to the plane of the lens, the complemental member of the mount having apertures to receive such dowels, and a screw also located outwardly beyond the lens edge with its axis arranged transverse to the plane of the lens, said screw adjustably and detachably connecting said members in order that the mount may accommodate lenses of different thicknesses, said connecting screw extending parallel to said pins or dowels.

In testimony whereof I have hereunto set my hand in presence of two subscribing witnesses.

ROBERT ENNIS BOYD.

Witnesses:
HENRY SKERRETT,
HENRY NORTON SKERRETT.